July 27, 1926. 1,593,921
J. G. SUTHERLAND
SECTIONAL AUTOMOBILE BUMPER
Filed Sept. 16, 1924 2 Sheets-Sheet 1
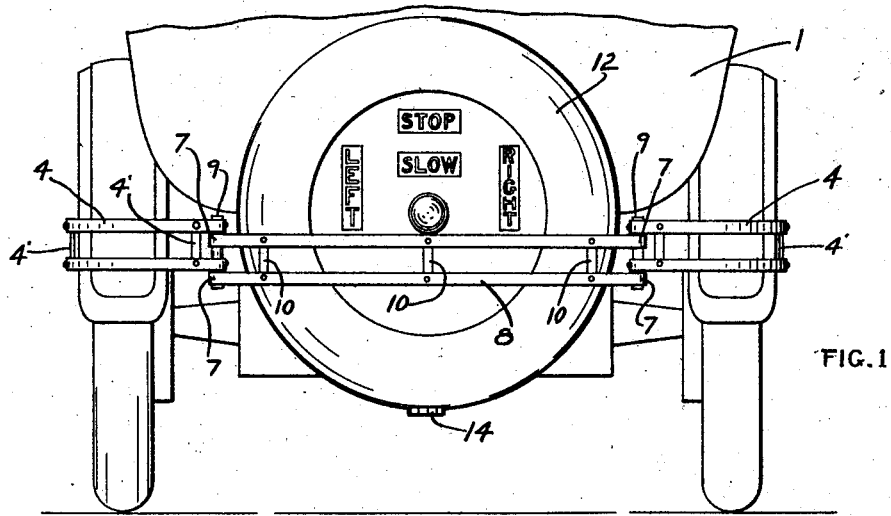
FIG. 1
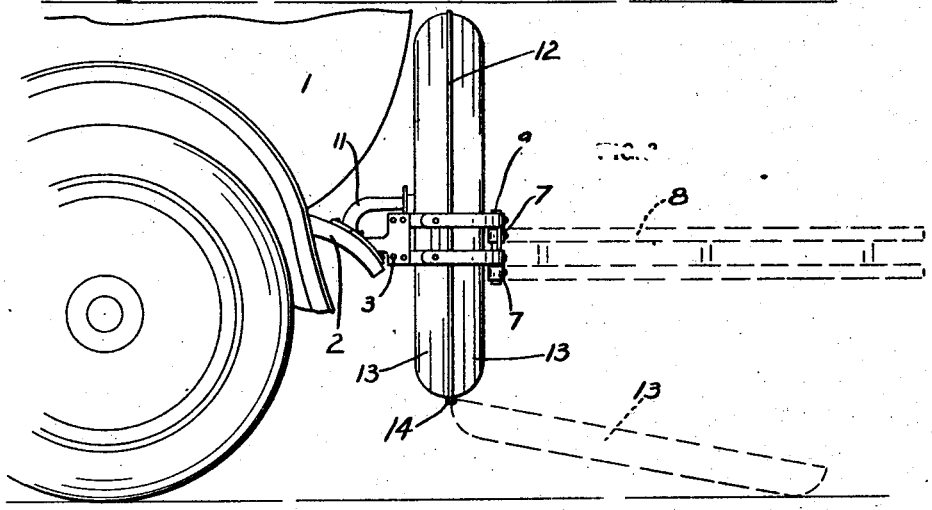
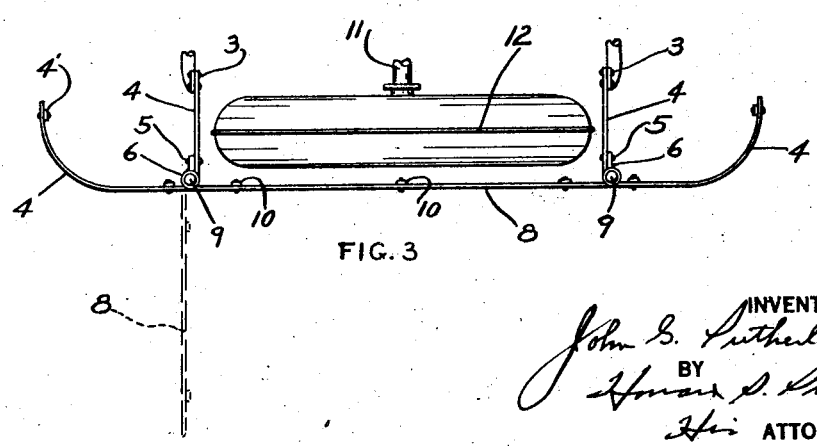
FIG. 3
INVENTOR,
John G. Sutherland
BY
His ATTORNEY July 27, 1926.

J. G. SUTHERLAND 1,593,921

SECTIONAL AUTOMOBILE BUMPER

Filed Sept. 16, 1924          2 Sheets-Sheet 2

INVENTOR
John G. Sutherland
BY
ATTORNEY

Patented July 27, 1926.

1,593,921

UNITED STATES PATENT OFFICE.

JOHN G. SUTHERLAND, OF OAKWOOD, OHIO.

SECTIONAL AUTOMOBILE BUMPER.

Application filed September 16, 1924. Serial No. 738,089.

This invention relates to new and useful improvements in sectional automobile bumpers, and has particular reference to a sectional bumper which is mounted behind a tire carrier.

It is one of the principal objects of my invention to provide a simple and efficient sectional bumper which is supported at the rear of an automobile, behind a tire carrier, and constructed to permit its middle section to be easily removed, or swung about a pivot, so that the tire carrier may be opened when desired, to receive a tire, demountable rim or wheel.

It is another object of my invention to provide a sectional bumper to surround a tire carrier so that the tire, rim or wheel can only be withdrawn therefrom when the middle section of the bumper is removed or swung about one of the pivots from its normal position to a right-angled one.

It is a further object of my invention to provide an automobile bumper having a pivoted middle section from which there extends inwardly a projection for entrance into a hole in a tire carrier, or disk wheel, to prevent its removal when the said section is locked in its closed position.

Figure 4:
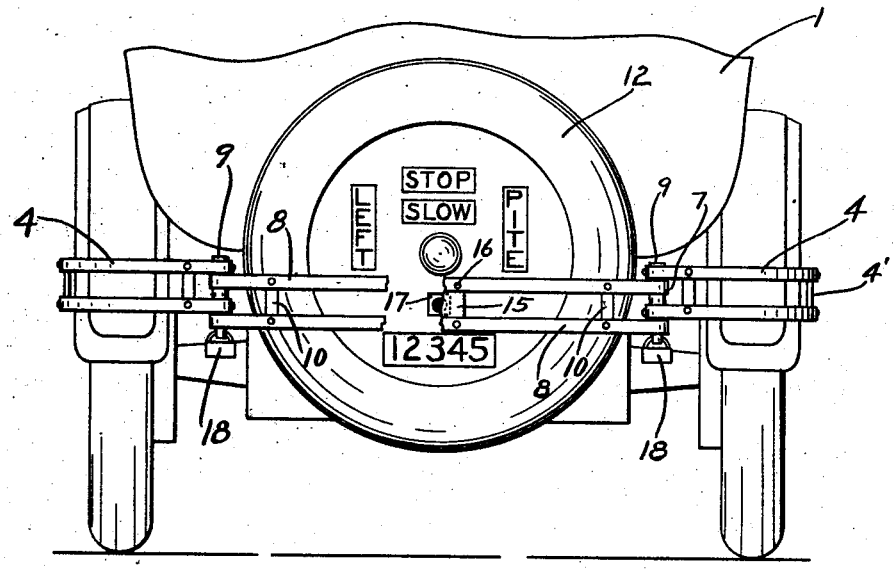

In the accompanying drawings illustrating my invention, Figure 1 is a rear elevation of my sectional bumper attached to an automobile behind the carrier. Figure 2 is a side elevation of the same, showing in dotted lines the middle section of the bumper turned at a right angle and the rear section of the tire carrier dropped to a horizontal position. Figure 3 is a top plan view, showing the tire carrier in a vertical or normal position and the middle section of the bumper in its normal closed position. Figure 4 is the same as Figure 1, with the cross member partially broken away to show the locking projection thereon and the slot which the projection enters in the tire carrier. And Figure 5 is the same as Figure 3 but showing the locking projection in place.

Referring to the accompanying drawings for a detailed description of the preferred form of embodiment of my invention illustrated therein, the numeral 1 designates an automobile, to each of the rear frames 2 of which, there is preferably secured by bolts 3 a pair of relatively U-shaped steel bumper sections 4, 4. These bumper sections extend rearwardly and horizontally from the frames 2. On the curved inner sides of the U-shaped sections 4, 4, where they make a right-angled turn, there are secured by bolts 5, 5, looped hinge portions 6, 6 for the purpose of co-operating with hinge portions 7, 7 of a middle bumper section 8. This middle bumper section is preferably made of two flat strips of steel, whose outer ends are turned to form the hinge loop portions 7, 7 that rest above and below the loops 6, 6 of the U-shaped sections 4, 4 and are pivotally connected thereto by pins or bolts 9, 9 respectively. These flat steel strips occupy a horizontal position, being parallel to each other and connected by transverse plates 10, which are riveted or bolted to the steel strips.

Secured to the rear end of the automobile, between the frames 2, is an arm 11 which is attached to the flat central portion of a duo-sectional tire carrier 12. This tire carrier is formed by two circular cupped portions 13, 13, which are connected by a hinge 14, and whose faces tightly engage each other when fastened by a lock not shown. The tire carrier is secured to the arm 11 in a vertical position, and when it is desired to remove a tire, rim or wheel therefrom, or place one in it, the middle bumper section 8 is unlocked at one end by withdrawing the pin 9 from that end, whereupon the middle section may be turned to a right-angled position, or removed entirely by withdrawing both pins. The tire carrier may then be unlocked to permit the rear cupped portion to drop to the position shown in dotted lines in Figure 2, whereupon a tire, wheel or rim may be inserted in, or withdrawn from the carrier.

Figure 5:
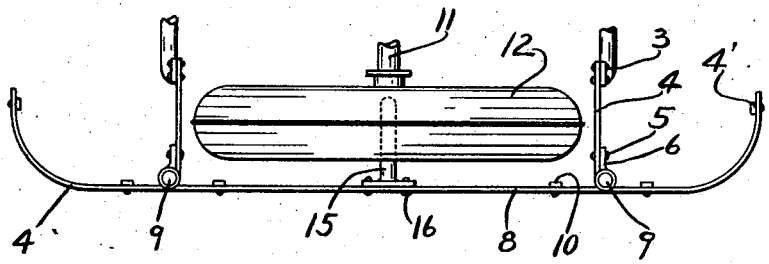

In Figures 4 and 5 I have illustrated a sectional bumper, to the middle section 8 of which there is secured a flanged projection 15 by means of rivets 16 or in any other suitable manner. When the middle section 8 is in its closed or normal position, the projection 15 will enter a slot 17 in the tire carrier. The pins 9 may have slots in their lower or smaller ends for the purpose of inserting the link of a padlock 18, to lock the bumper sections together and prevent the removal of a tire carrier from its rack, or support, or the middle section may be locked in its closed position in any other suitable manner.

While I have shown a tire carrier of the type described as being mounted in front of my sectional bumper, any other type of carrier may be enclosed by it if desired.

Having described my invention, I claim:—

1. In a device of the type described, a sectional bumper secured to the rear end of an automobile behind a tire carrier on the latter, said bumper comprising two end members bent at right angles and formed with loops at said angles, a middle part for said bumper, adapted to be placed behind the tire carrier and formed at its ends with loops adapted to register with the loops on the end members, and a pin adapted to be projected through each set of registering loops for the purpose specified.

2. In a device of the type described, a bumper secured to the rear end of an automobile adjacent a tire carrier on the latter, and a locking projection on the bumper adapted to engage the tire carrier.

3. In a device of the type described, a bumper secured to the rear end of an automobile adjacent a tire carrier on the latter, a pivoted section on said bumper, and a locking projection on said section adapted to engage the tire carrier.

4. In a device of the type described, a bumper secured to the rear end of an automobile adjacent a tire carrier on the latter, said tire carrier containing a locking hole, a pivoted section on said bumper, and a projection on said section adapted to enter the hole in the tire carrier for the purpose specified.

5. In a device of the type described, a bumper secured to the rear end of an automobile adjacent a tire carrier on the latter, said tire carrier containing a locking hole, a pivoted section on said bumper, a projection on said section adapted to enter the hole in the tire carrier and means for locking the pivoted section in a stationary position after the projection has entered the hole in said tire carrier.

In testimony whereof I have hereunto set my hand this 15th day of September, 1924.

JOHN G. SUTHERLAND.